May 26, 1936.  M. OLLEY  2,041,947

AUTOMOBILE SUSPENSION SYSTEM

Filed Aug. 17, 1934  2 Sheets-Sheet 1

Inventor
Maurice Olley

By Blackmore, Spencer & Flink
Attorneys

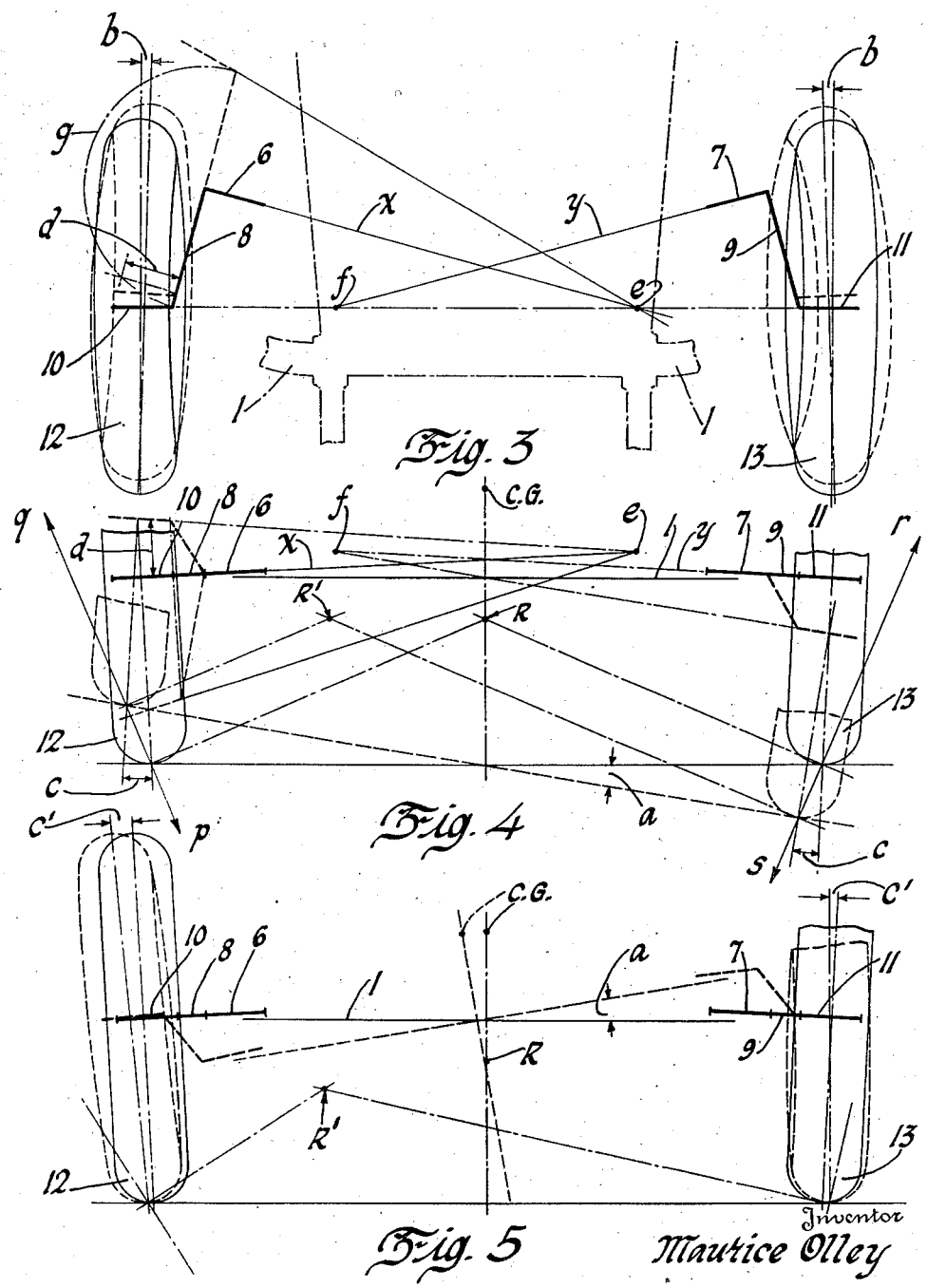

Patented May 26, 1936

2,041,947

UNITED STATES PATENT OFFICE 2,041,947

AUTOMOBILE SUSPENSION SYSTEM

Maurice Olley, Detroit, Mich., assignor to General Motors Corporation, Detroit, Mich., a corporation of Delaware Application August 17, 1934, Serial No. 740,261

20 Claims. (Cl. 280—124)

This invention relates to motor vehicles having independent suspension of a pair of road wheels of the type in which each road wheel is supported at the end of a lever arm oscillating in a substantially vertical plane about an axis on the vehicle. It is equally applicable whether the road wheels are dirigible or not.

When, in a suspension system of the foregoing type, the pivot axis of the lever arm is normally perpendicular to the normally vertical longitudinal mid-plane of the vehicle, the road wheel always maintains its same relationship to a definite plane parallel to the normally vertical longitudinal mid-plane of the vehicle upon upward or downward oscillations or deflections of the lever arm and the road wheel relatively to the vehicle frame, i. e. there is no change in the distance between the point of tire contact with the road and the normally vertical longitudinal mid-plane of the vehicle—in other words, there is no "scrubbing" of the tires on the road—and there is no change in the camber of the road wheel. When the vehicle rolls, under the influence of centrifugal force in turning corners, the wheel planes are tilted through an angle equal to the angle through which the normally vertical longitudinal mid-plane of the vehicle is tilted.

In known constructions, as applied to dirigible road wheels, the pivot axes about which the wheel supporting lever arms oscillate have been normally at right angles to the longitudinal axis of the vehicle, with each wheel spindle axis and its lever arm pivot axis parallel to each other in a common plane which slopes slightly downwards from the normally vertical longitudinal mid-plane of the vehicle towards the outside of the vehicle, to provide the wheels with the requisite camber. In such an arrangement there is with any deflection of the road wheels upwards or downwards relatively to the frame, a scrubbing of the tires on the road, but no change in camber.

It is desirable that there should be some scrubbing of the tires on the road accompanied by a change in camber all as hereinafter described.

The object of the invention is, generally, to improve the ease of handling and the stability in turning corners and negotiating curves, of a vehicle having independent suspension of the road wheels of the longitudinally arranged lever arm type, pivoting about an axis transverse to the longitudinal axis of the vehicle.

It is a specific object of the invention to raise the roll center of a vehicle having such a suspension system, away from the ground level and closer to the center of gravity of the vehicle, to lessen the roll in cornering.

It is another object of the invention to effect the last named object, with a construction in which when the vehicle rolls in cornering there will be a change in camber, so that the wheels will tilt through an angle less than the normally vertical longitudinal mid-plane of the vehicle is tilted.

The above and other objects of the invention will be apparent as the description proceeds.

It is known that in any independent suspension system in which there is no scrubbing of the tires on the road with deflection, the instantaneous center about which the vehicle rolls in cornering is at ground level and that when deflection is accompanied by "scrub" of both tires in the same direction relatively to the normally vertical longitudinal mid-plane of the vehicle, the virtual center about which the vehicle rolls in cornering no longer remains at ground level.

It has been found that if when the vehicle rolls in cornering there is a movement or "scrub" to the outside of the radius about which the vehicle is turning, of the points of tire contact of each wheel with the road, relatively to the normally vertical longitudinal mid-plane of the vehicle center of gravity—the roll center is above the ground level. (This condition obtains in independent suspension systems of the transverse pendulum or swinging axle type.) Conversely, if the points of tire contact of each wheel with the road are moved inwardly of the radius about which the vehicle is turning, relatively to the normally vertical longitudinal mid-plane of the vehicle, the roll center is below the ground level. The distance the roll center is moved from ground level depends on the "scrub" angle, i. e. scrub per inch of deflection.

Expressed otherwise, the instantaneous roll center, which is that center about which the suspended parts of the vehicle may be considered to turn relatively to the unsuspended parts of the vehicle at any instant in the motion of translation of the vehicle during roll, lies at the intersection of lines drawn from the points of contact of the tires with the road at right angles to the paths of movement of the points of tire contact relatively to the suspended parts of the vehicle, in a vertical plane perpendicular to the normally vertical longitudinal mid-plane of the vehicle. The roll center is at ground level when the said paths of movement of the points of tire contact are parallel with the normally vertical longitudinal mid-plane of the vehicle, it is above the ground level when they are divergent upwardly therefrom, and below ground level when they are divergent downwardly therefrom.

According to the invention, the pivot axis for the wheel supporting lever arm is not normally perpendicular to the normally vertical longitudinal mid-plane of the vehicle. In the case of dirigible wheels, the wheel spindle axis and the pivot axis of the lever arm lie in a common plane which is normally substantially horizontal, but are in a non-parallel relationship to each other, with their axes produced, intersecting each other on the vehicle side of the wheel.

With such an arrangement the wheel spindle is constrained to sweep through a conic surface of revolution, of which the axis is the pivot axis of the wheel supporting lever arm.

Both of the road wheels, that to the outside and that to the inside of the radius about which the vehicle is turning, tilt relatively to the ground surface through an angle which is less than the angle through which the normally vertical longitudinal mid-plane of the vehicle is tilted relatively to the ground surface when the vehicle rolls in turning a corner, there is movement—towards the outside of the radius about which the vehicle is turning—of the point of tire contact with the road, relatively to the normally vertical longitudinal mid-plane of the vehicle, and the roll center is raised above the ground level.

The maximum limit to the scrubbing of the tire on the road is governed by the permissible tire wear and lateral "joggling" of the car.

Because the wheels tilt through a lesser angle, there is the advantage that the centripetal force (i. e. the radial road reaction which thrusts the vehicle round the turn and which is reduced by an amount depending on the extent to which the wheel plane is tilted to the outside of the radius about which the vehicle is turning) is not lessened as much as it otherwise would be while the torque about the king pin which tends to swing or straighten out the wheels and restore them to a position for straight ahead movement of the vehicle and which increases as the wheels are tilted is not increased as much as it otherwise would be.

The maximum limit to changing wheel tilt is governed by the permissible gyroscopic reactions on the wheel.

If the wheel supporting lever arm is arranged so that its pivot axis is to the rear of the wheel spindle the wheels "toe out" somewhat with upward or downward deflection of the road wheels relatively to the vehicle frame, whereas if the pivot axis of the wheel supporting lever arm is arranged forwardly of the wheel spindle, the wheels "toe in" somewhat with upward or downward deflections of the road wheels.

The arrangement in which the wheels "toe out" with deflections is preferred for steered road wheels because the "slip" angle (i. e. the angle between the "aim" and the actual path of travel of the steered road wheels) of the inner wheel is increased and that of the outer wheel is decreased. The "slip" angle must exist before centripetal force to cause the turn can be set up, and an increase of slip angle for the inner wheel and a decrease for the outer wheel throws more of the work of turning the vehicle on the inside wheel, thus reducing the otherwise excessive tread wear on the outside of the tire of the outside wheel, reducing the squeal therefrom and improving the ease of handling.

The drawings show the application of the invention to a pair of dirigible road wheels having the wheel supporting lever arms pivotally mounted to the rear of the wheel spindle axes, for pivotal movement in a substantially vertical plane, on a bracket which swings in a substantially horizontal plane about a substantially vertical king pin mounted directly on the frame, the movement of the lever arm in a substantially vertical plane relatively to the bracket being resiliently resisted by spring means between the lever arm and the bracket.

In the drawings

Figure 3 is a diagrammatic plan view showing in full lines the position of the parts corresponding to Figure 1, and in broken lines the position of the parts when one wheel has been deflected upwards and the other has been deflected downwards relatively to the frame, the frame remaining horizontal.

Figure 4 is a diagrammatic front elevational view of Figure 3, showing in full lines the position of the parts corresponding to Figure 2 and in broken lines the position of the parts according to the broken line position of Figure 3.

Figure 5 shows both positions of the parts of Figure 4 superimposed upon a common ground line as when the vehicle frame has rolled through an angle $a$.

Figure 1:
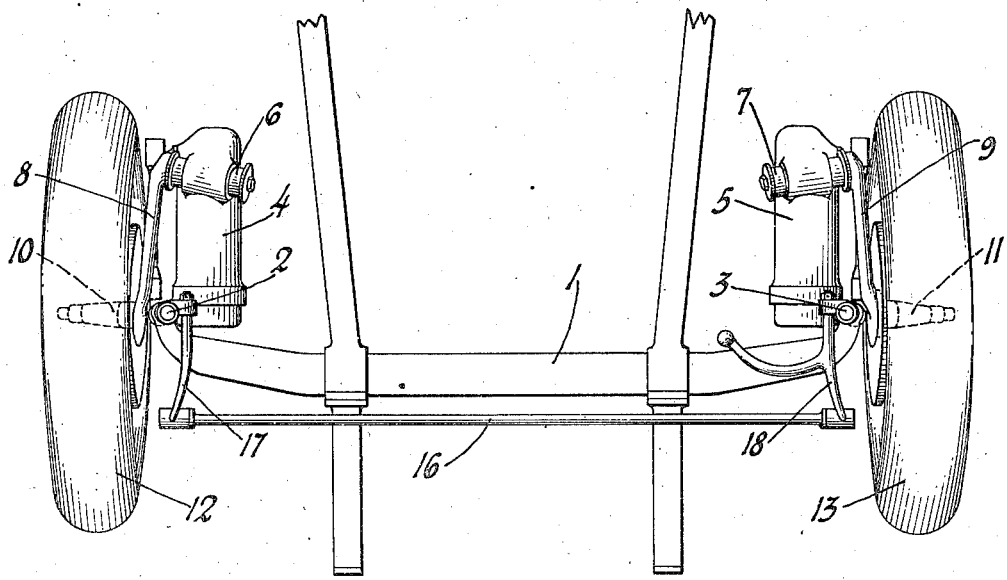
Figure 1 is a plan view of the front end of a motor vehicle frame with suspension means for the front dirigible road wheels according to the invention.
Figure 2:
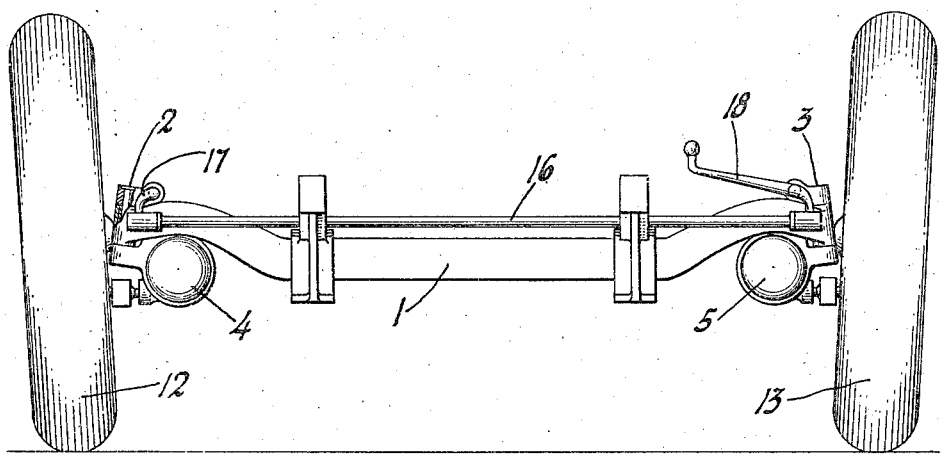
Figure 2 is a front elevational view of Figure 1.

The vehicle frame includes a transverse member 1 rigidly attached thereto. Mounted at each end of the transverse member 1 for pivotal movement in a substantially horizontal plane about pivot axes constituted by king pins 2 and 3, are brackets 4 and 5.

The brackets 4 and 5 extend from their king pins towards the rear of the vehicle, and at their rearward ends provide support for the substantially horizontal pivot axes 6 and 7 of wheel supporting lever arms 8 and 9 respectively, carrying spindles 10 and 11 for road wheels 12 and 13. The wheel supporting lever arms extend forwardly from their pivot axes with the wheel spindle axes normally intersecting the king pin axes.

The pivot and spindle axes of each wheel supporting lever arm lie in a common plane, with their axes produced, intersecting each other, on the vehicle side of the wheel.

The suspension may be arranged to have the usual "caster" effect in the normal position either by inclining the king pins, or by making the lever arms of such a length that the wheel spindle axes produced, pass to the rear of the king pin axes. The usual camber and "toe in" of the wheels in the normal position may be provided in the disposition of the pivot axes of the lever arms. In the drawings, a normal caster has been provided by the usual inclination of the king pins; normal camber has been provided by a slight downward disposition of the pivot axes towards the outside of the vehicle; the wheels neither "toe in" nor "toe out" in the normal position.

The brackets 4 and 5 are conveniently arranged to constitute housings for suitable spring means (not shown) resiliently resisting pivotal movement of the wheel supporting lever arms relatively to the brackets 4 and 5 and the vehicle frame.

The road wheels are connected together for dirigible movement about their king pin axes by a tie rod 16 between steering arms 17 and 18 attached to the brackets 4 and 5 respectively.

Referring now to Figures 3 and 4, $x$ and $y$ are the axes of the conic surfaces of revolution swept through by the wheel spindle axes 10 and 11 respectively. The apices of these conic surfaces are at $e$ and $f$.

The wheel spindle axes 10 and 11 each have been deflected from their full line positions indicated, upwards and downwards respectively relatively to the vehicle frame, through a vertical distance $d$, into the broken line positions indicated, the vehicle frame being assumed to remain horizontal. The arc $g$ respresents the path of movement of a point on spindle 10 projected in a plane normal to the axis $x$.

As shown in Figure 3, the median planes of both wheels have "toed out" equally through an angle $b$. It will be apparent from an inspection of Figure 3 that in the normal position the rate of change of "toe out" is zero and that this rate increases as the deflection of the wheels, above or below the normal position, is increased.

As shown in Figure 4, when the wheel 12 is deflected upwards its point of tire contact with the road moves along a path $pq$, while when the wheel 13 is deflected downwards its point of tire contact with the road moves along a path $rs$. The angle which the line $pq$ or $rs$ makes with the vertical may be described as the "scrub" angle since it governs the degree of lateral scrubbing of the tire on the road for any given deflection.

The instantaneous roll center for any given position of the road wheels lies at the intersection of lines drawn normal to the lines $pq$ and $rs$ from their point of intersection with the ground (i. e. from the points of tire contact with the ground). Thus, in the normal position in Figures 4 and 5 the roll center is at R, while in the broken line position to which the wheels have been deflected the roll center is at R'. In the normal position the height of the roll center above ground level is equal to half the track of the wheels multiplied by the tangent of the "scrub" angle.

In Figure 4 it will be noted that the planes of both wheels have tilted equally relatively to their original position through an angle C which increases directly with the deflection of the wheels relatively to the frame.

While in Figures 3 and 4 it was assumed that the frame remained stationary and horizontal while the wheels were respectively raised and lowered relatively to the frame, the conditions are exactly the same as if the frame had rolled or tilted through an angle $a$ relatively to the road.

In Figure 5, both positions of the parts of Figure 4 have been superimposed upon a common ground line and it will be seen that the frame has rolled through an angle $a$, while the wheels have tilted in the same direction through an angle $c'$ which is less than $a$ and is equal to the angle $a$—the angle $c$ of Figure 4.

As compared with a suspension system in which the pivot axis of the lever arm and the spindle axis of the road wheel are parallel with each other, a suspension system according to the invention has improved stability in negotiating a turn because of a roll center closer to the horizontal plane of the center of gravity of the vehicle; because of the reduced tilt of the wheels there is a greater centripetal force tending to push the car round the turn, and there is less torque about the king pin tending to restore the wheels to a position for straight ahead movement of the vehicle. Since in the preferred arrangement, the wheels also "toe out" somewhat with deflections due to roll, the "slip" angle of the wheel to the inside of the turn is increased, while that of the wheel to the outside of the turn is reduced, thereby reducing the load on the outer wheel, and improving the ease of handling.

While in the arrangement illustrated, dirigible movement of the road wheels is effected by pivotal movement of the wheel supporting lever arms, it will be apparent that the invention is equally applicable to constructions in which dirigible movement of the road wheels is effected by a pivotal movement of the wheel spindle about the wheel supporting lever arm, as well as to wheel supporting lever arms for non-dirigible wheels.

I claim:

1. In a motor vehicle in which a pair of road wheels are independently supported by a suspension system in which each road wheel is mounted on an axis supported solely by a single lever arm pivoted upon an axis transverse to the normally vertical longitudinal mid-plane of the vehicle, the position of the wheel axis relatively to the lever arm being unchanged by pivotal movement of the lever arm about its axis, the disposition of the pivot axis of the lever arm in a position in which it is not normally perpendicular to the normally vertical longitudinal mid-plane of the vehicle, and not normally parallel to the axis on which the wheel is mounted, whereby the angular relationship of the axis on which the wheel is mounted, to the normally vertical longitudinal mid-plane of the vehicle, is changed by pivotal movement of the lever arm about its axis.

2. The combination according to claim 1, in which the wheels are dirigible wheels, and the pivot axis for each wheel supporting lever arm is mounted on a bracket capable of swinging movement in a substantially horizontal plane, about a substantially vertical pivot axis.

3. In a motor vehicle in which a pair of road wheels are independently supported by a suspension system in which each road wheel is mounted on an axis supported solely by a single lever arm pivoted upon an axis transverse to the normally vertical longitudinal mid-plane of the vehicle, the position of the wheel axis relatively to the lever arm being unchanged by pivotal movement of the lever arm about its axis, the disposition of the pivot axis of the lever arm towards the rear of the vehicle relatively to the axis on which the wheel is mounted and in a position relatively to the vehicle frame in which it is not normally perpendicular to the normally vertical longitudinal mid-plane of the vehicle, and not normally parallel to the axis on which the wheel is mounted, whereby the angular relationship of the axis on which the wheel is mounted, to the normally vertical longitudinal mid-plane of the vehicle, is changed by pivotal movement of the lever arm about its axis.

4. The combination according to claim 3, in which the wheels are dirigible wheels, and the pivot axis for each wheel supporting lever arm is mounted on a bracket capable of swinging movement in a substantially horizontal plane, about a substantially vertical pivot axis.

5. In a motor vehicle in which a pair of road wheels are independently supported by a suspension system in which each road wheel is mounted on an axis supported solely by a single lever arm pivoted upon an axis transverse to the normally vertical longitudinal mid-plane of the vehicle, the position of the wheel axis relatively to the lever arm being unchanged by pivotal movement of the lever arm about its axis, the disposition of the wheel axis and the pivot axis of the lever arm in a normally substantially horizontal common plane, with the pivot axis not normally perpendicular to the normally vertical longitudinal mid-plane of the vehicle and not normally parallel to the wheel axis, whereby the angular relationship of the axis on which the wheel is mounted, to the normally vertical longitudinal mid-plane of the vehicle, is changed by pivotal movement of the lever arm about its axis.

6. The combination according to claim 5, in which the wheels are dirigible wheels, and the pivot axis for each wheel supporting lever arm is mounted on a bracket capable of swinging movement in a substantially horizontal plane, about a substantially vertical pivot axis.

7. In a motor vehicle in which a pair of road wheels are independently supported by a suspension system in which each road wheel is mounted on an axis supported solely by a single lever arm pivoted upon an axis transverse to the normally vertical longitudinal mid-plane of the vehicle, the position of the wheel axis relatively to the lever arm being unchanged by pivotal movement of the lever arm about its axis, the disposition of the wheel axis and the pivot axis of the lever arm in a normally substantially horizontal common plane, with the pivot axis not normally perpendicular to the normally vertical longitudinal mid-plane of the vehicle and disposed towards the rear of the vehicle relatively to the wheel axis and not normally parallel to the wheel axis, whereby the angular relationship of the axis on which the wheel is mounted, to the normally vertical longitudinal mid-plane of the vehicle, is changed by pivotal movement of the lever arm about its axis.

8. The combination according to claim 7 in which the wheels are dirigible wheels, and the pivot axis for each wheel supporting lever arm is mounted on a bracket capable of swinging movement in a substantially horizontal plane, about a substantially vertical pivot axis.

9. In a motor vehicle in which a pair of road wheels are independently supported by a suspension system in which each road wheel is mounted on an axis supported solely by a single lever arm pivoted upon an axis transverse to the normally vertical longitudinal mid-plane of the vehicle, the position of the wheel axis relatively to the lever arm being unchanged by pivotal movement of the lever arm about its axis, the disposition of the wheel axis and the pivot axis of the lever arm in a normally substantially horizontal common plane, with the pivot axis not normally perpendicular to the normally vertical longitudinal mid-plane of the vehicle and with the intersection of the wheel axis and the pivot axis produced, on the vehicle side of the wheel, whereby the angular relationship of the axis on which the wheel is mounted, to the normally vertical longitudinal mid-plane of the vehicle, is changed by pivotal movement of the lever arm about its axis.

10. The combination according to claim 9 in which the wheels are dirigible wheels, and the pivot axis for each wheel supporting lever arm is mounted on a bracket capable of swinging movement in a substantially horizontal plane, about a substantially vertical pivot axis.

11. In a motor vehicle in which a pair of road wheels are independently supported by a suspension system in which each road wheel is mounted on an axis supported solely by a single lever arm pivoted upon an axis transverse to the normally vertical longitudinal mid-plane of the vehicle, the position of the wheel axis relatively to the lever arm being unchanged by pivotal movement of the lever arm about its axis, the disposition of the wheel axis and the pivot axis of the lever arm in a normally substantially horizontal common plane, with the pivot axis not normally perpendicular to the normally vertical longitudinal mid-plane of the vehicle and with the intersection of the wheel axis and the pivot axis produced, on the vehicle side of the wheel, the pivot axis of the lever arm being disposed towards the rear of the vehicle relatively to the wheel axis, whereby the angular relationship of the axis on which the wheel is mounted, to the normally vertical longitudinal mid-plane of the vehicle, is changed by pivotal movement of the lever arm about its axis.

12. The combination according to claim 11, in which the wheels are dirigible wheels, and the pivot axis for each wheel supporting lever arm is mounted on a bracket capable of swinging movement in a substantially horizontal plane, about a substantially vertical pivot axis.

13. In a motor vehicle in which a pair of road wheels are independently supported by a suspension system in which each of the road wheels is mounted on an axis rigidly supported upon a single pivotal lever arm constituting the sole supporting means for the wheel and capable of pivotal swinging motion in a substantially vertical plane relatively to the vehicle frame, a pivot axis for each of the lever arms so arranged and disposed that it is neither parallel to the normally vertical longitudinal mid-plane of the vehicle nor to the axis of its road wheel, whereby when the vehicle rolls in turning a corner, the planes of each of the road wheels tilt through an angle less than the normally vertical longitudinal mid-plane of the vehicle is tilted, and the vehicle rolls about a center which is above ground level.

14. The combination according to claim 13 in which the pivot axes of the lever arms are disposed towards the rear of the vehicle relatively to the wheel spindle axes.

15. In a motor vehicle in which a pair of dirigible road wheels are independently supported by a suspension system in which each road wheel is mounted on an axis supported by a lever arm pivoted upon an axis mounted on a bracket capable of swinging movement about a king pin axis on the vehicle frame, the disposition of the pivot axis of the lever arm on the bracket not normally perpendicular to the normally vertical longitudinal mid-plane of the vehicle, and not parallel to the axis on which the wheel is mounted, the wheel axis and the pivot axis of the lever arm produced intersecting each other on the vehicle side of the wheel, whereby, when the vehicle rolls in turning a corner, there is scrubbing of the points of contact of the tires with the road towards the outside of the radius about which the vehicle is turning, relatively to the normally vertical longitudinal mid-plane of the vehicle, and the roll center is raised; the pivot axis of the lever arm being disposed towards the rear of the vehicle relatively to the wheel axis whereby the wheels toe out when the vehicle rolls.

16. In a motor vehicle in which a pair of dirigible road wheels are independently supported by a suspension system in which each road wheel is mounted on an axis supported by a lever arm pivoted upon an axis mounted on a bracket capable of swinging movement about a king pin axis on the vehicle frame, the disposition of the pivot axis of the lever arm on the bracket not normally perpendicular to the normally vertical longitudinal mid-plane of the vehicle, and not parallel to the axis on which the wheel is mounted, the wheel axis and the pivot axis of the lever arm produced intersecting each other on the vehicle side of the wheel, whereby, when the vehicle rolls in turning a corner, the wheels tilt through an angle less than the normally vertical longitudinal mid-plane of the vehicle is tilted, and there is scrubbing of the points of contact of the tires with the road towards the outside of the radius about which the vehicle is turning, relatively to the normally vertical longitudinal mid-plane of the vehicle, the roll center being thereby raised; the pivot axis of the lever arm being disposed towards the rear of the vehicle relatively to the wheel axis whereby the wheels toe out when the vehicle rolls.

17. In a motor vehicle in which a pair of dirigible road wheels are independently supported by a suspension system in which each road wheel is mounted on an axis supported by a lever arm pivoted upon an axis mounted on a bracket capable of swinging movement about a king pin axis on the vehicle frame, the disposition of the pivot axis of the lever arm on the bracket not normally perpendicular to the normally vertical longitudinal mid-plane of the vehicle, and not parallel to the axis on which the wheel is mounted, the wheel axis and the pivot axis of the lever arm produced intersecting each other on the vehicle side of the wheel, and the pivot axis being disposed towards the rear of the vehicle relatively to the wheel axis, whereby the roll center of the vehicle is raised, and when the vehicle rolls in turning a corner both wheels toe out and tilt through an angle less than the normally vertical longitudinal mid-plane of the vehicle is tilted.

18. A vehicle suspension according to claim 1 in which the pivot axis of the lever arm is closer to the vertical transverse plane of the center of gravity of the vehicle than the axis on which the wheel is mounted.

19. A vehicle suspension according to claim 5 in which the pivot axis of the lever arm is closer to the vertical transverse plane of the center of gravity of the vehicle than the wheel axis.

20. A vehicle suspension system according to claim 5 in which the angle between the pivot axis of the lever arm and the wheel axis is less than 30°.

MAURICE OLLEY.